(12) United States Patent
Wood

(10) Patent No.: US 8,215,590 B2
(45) Date of Patent: Jul. 10, 2012

(54) AEROFOIL WITH LEADING EDGE PROJECTION

(75) Inventor: Norman Wood, Bristol (GB)

(73) Assignee: Airbus Operations Limited, Bristol (GB)

( * ) Notice: Subject to any disclaimer, the term of this patent is extended or adjusted under 35 U.S.C. 154(b) by 1024 days.

(21) Appl. No.: 12/107,816

(22) Filed: Apr. 23, 2008

(65) Prior Publication Data

US 2008/0265103 A1    Oct. 30, 2008

(30) Foreign Application Priority Data

Apr. 30, 2007    (GB) .................................. 0708335.5

(51) Int. Cl.
*B64C 3/50* (2006.01)
(52) U.S. Cl. ........................................ 244/214; 244/215
(58) Field of Classification Search ........... 244/211–216
See application file for complete search history.

(56) References Cited

U.S. PATENT DOCUMENTS

| | | | |
|---|---|---|---|
| 2,920,844 A * | 1/1960 | Marshall et al. | 244/207 |
| 2,924,399 A * | 2/1960 | Titus et al. | 244/216 |
| 4,702,441 A | 10/1987 | Wang | |
| 5,213,287 A | 5/1993 | Barron | |
| 6,328,265 B1 * | 12/2001 | Dizdarevic | 244/213 |
| 6,457,680 B1 * | 10/2002 | Dobrzynski et al. | 244/210 |
| 6,789,769 B2 * | 9/2004 | Mau et al. | 244/214 |
| 7,216,835 B2 * | 5/2007 | Arata | 244/214 |

FOREIGN PATENT DOCUMENTS

| | | |
|---|---|---|
| DE | 3412371 A1 | 11/1985 |
| GB | 524984 | 8/1940 |
| GB | 741261 A | 11/1955 |
| GB | 1181991 | 2/1970 |
| GB | 1599633 | 10/1981 |

OTHER PUBLICATIONS

GB Search Report for Application No. GB0708335.5 dated Aug. 15, 2007.

* cited by examiner

*Primary Examiner* — Tien Dinh
(74) *Attorney, Agent, or Firm* — Lowe, Hauptman, Ham & Berner, LLP

(57) ABSTRACT

An aerofoil is provided having an upper surface, a lower surface, a leading edge between the upper and lower surfaces at the front of the aerofoil, and a trailing edge between the upper and lower surfaces at the rear of the aerofoil. The leading edge has projection where it meets the lower surface of the aerofoil, and a cove between the projection and upper surface of the aerofoil. A flow vortex is formed in the cove which exhibits increasingly axial flow that retains flow attachment to higher angles of attack.

20 Claims, 6 Drawing Sheets

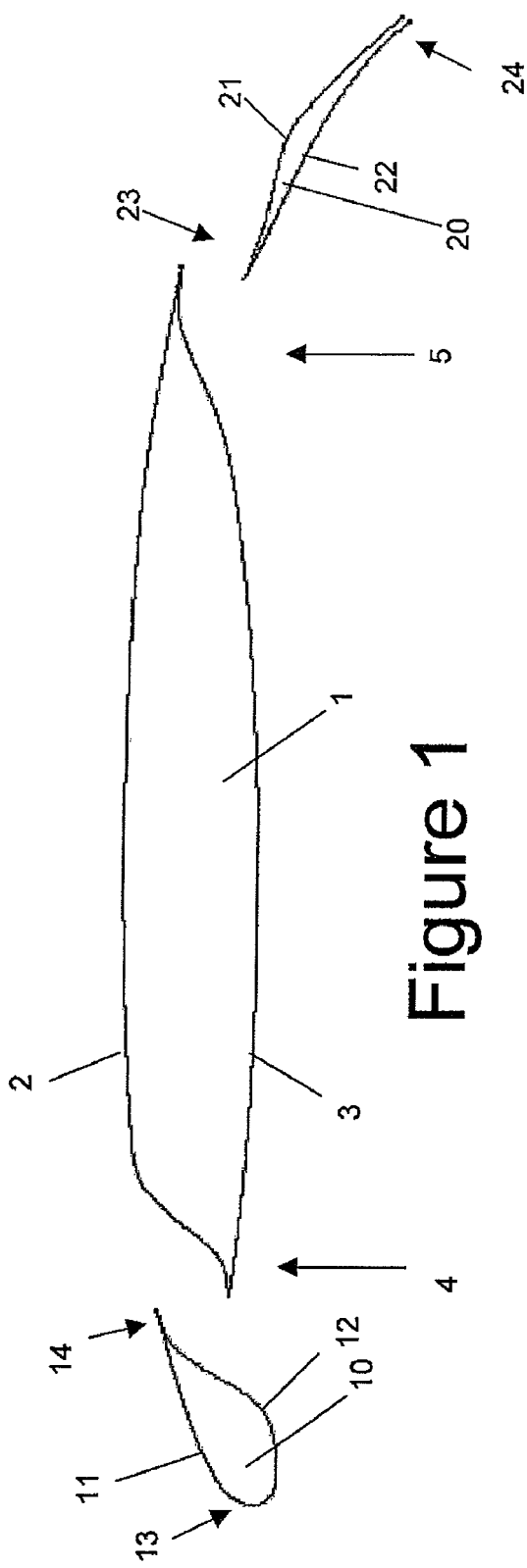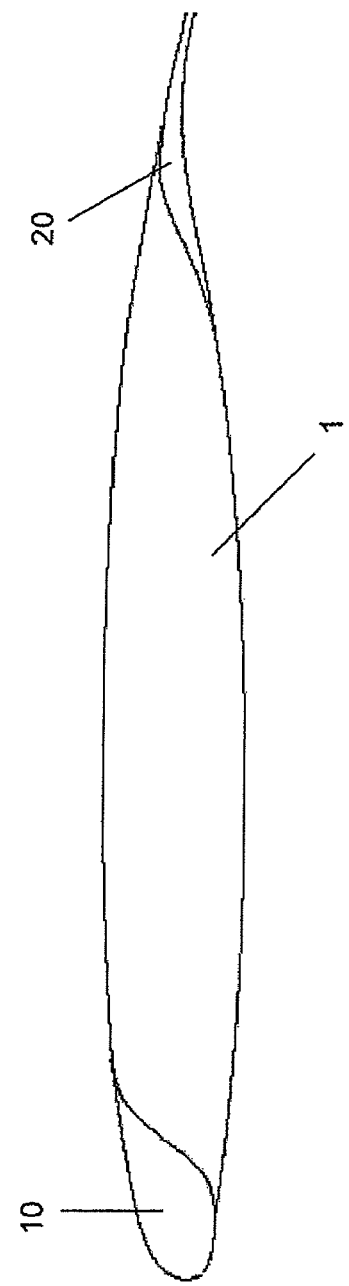

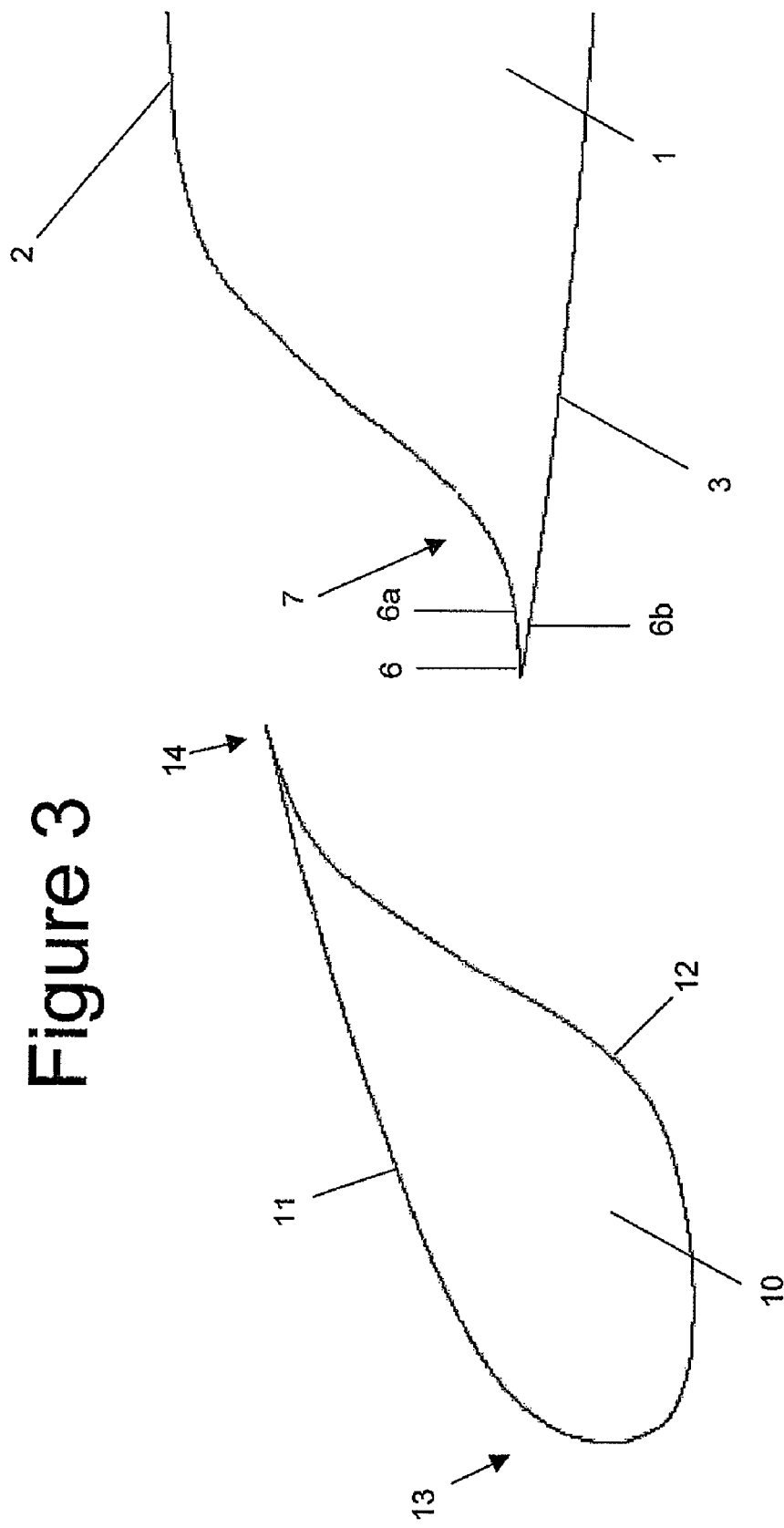

US 8,215,590 B2

AEROFOIL WITH LEADING EDGE PROJECTION

RELATED APPLICATIONS

The present application is based on, and claims priority from, British Application Number 0708335.5, filed Apr. 30, 2007, the disclosure of which is hereby incorporated by reference herein in its entirety.

FIELD OF THE INVENTION

The present invention relates to an aerofoil, and a method of controlling the flow of air over an aerofoil.

BACKGROUND OF THE INVENTION

A conventional aircraft wing has an upper surface, a lower surface, a sharp trailing edge, and a smoothly outwardly curved leading edge. As the angle of attack of the wing increases, the lift provided by the wing also increases until it exceeds a stall angle. Above the stall angle, the airflow separates from the upper surface of the wing and becomes turbulent, and as a result the lift decreases.

A number of control surfaces may be attached to the leading edge of the wing to improve its control or handling characteristics. These include stall strips and leading edge cuffs. A stall strip is a small v-shaped piece of metal attached to the leading edge of the wing. At high angles of attack the stall strip disrupts the boundary layer causing the affected portion of the wing to stall. See for example U.S. Pat. No. 4,702,441. A leading edge cuff is described in U.S. Pat. No. 5,213,287. The cuff extends smoothly from the top surface of the wing to a point forward and below the forwardmost point of the wing, then rearwardly to the bottom surface of the wing. Such leading edge cuffs are believed to increase the stall angle of the wing, as well as making the stall more benign.

Auxiliary aerofoils such as leading edge slats and trailing edge flaps are conventionally provided in order to increase lift during landing and take off, and increase the stall angle of the wing. These auxiliary aerofoils are extended during the landing approach, and before take off, and a gap is generally present between each auxiliary aerofoil and the main wing aerofoil.

Conventionally a leading edge slat is shaped with a cove in its rear face which is a negative image of the outwardly curved leading edge of the main wing aerofoil. A large separated region is present in the slat cove, which gives rise to unsteady flow features that are ultimately responsible for noise generation. These noise sources can be a significant component of the overall airframe noise during take off and landing, and also tend to propagate down, increasing the noise perceived by a person on the ground. A similar problem also exists in relation to the flap and trailing edge of the main wing aerofoil.

One approach to minimising such noise is described in U.S. Pat. No. 6,457,680. A separating surface is provided on the slat and extends in the direction of the main aerofoil along a separation flow line between a vortex flow region and a slat cove flow region. The separating surface may be hinged on a rear face of the flat, or may comprise an inflatable member. A problem with this solution is that the separating surface may compromise the performance of the slat.

SUMMARY OF THE INVENTION

A first aspect of the invention provides an aerofoil comprising: an upper surface; a lower surface; a leading edge between the upper and lower surfaces at the front of the aerofoil; and a trailing edge between the upper and lower surfaces at the rear of the aerofoil, wherein the leading edge has a projection where it meets the lower surface, and a cove between the projection and the upper surface.

A second aspect of the invention provides a method of controlling the flow of air over an aerofoil, the method comprising inducing separated flow with a projection in a leading edge of the aerofoil; inducing a flow vortex in a cove above the projection; and re-attaching flow to the aerofoil above the cove.

The first and second aspects of the invention provide enhanced performance, as a flow vortex may be formed in the cove which exhibits increasingly strong axial flow that retains flow attachment to higher angles of attack. As a result the stall angle of the aerofoil may be increased.

Preferably the aerofoil is swept.

The cove may have a polygonal series of planar surfaces which meet at sharp edges, or more preferably is smoothly curved.

Preferably the projection has an upper surface, a lower surface, and an edge between the upper and lower surfaces. This geometry tends to induce flow separation as required by the second aspect of the invention.

The aerofoil may be employed in a wing without slots, slats or flaps. Alternatively the aerofoil may be employed in an aircraft wing comprising: a leading aerofoil; a trailing aerofoil according to the first aspect of the invention positioned behind the leading aerofoil; and a gap between the leading aerofoil and the trailing aerofoil. In this case, the novel geometry of the leading edge of the trailing aerofoil enables the leading aerofoil to be shaped in a way that reduces noise. Any noise generated by flow separation at the leading edge of the trailing aerofoil tends to propagate upwards, which is less perceptible to a person on the ground than downwardly directed noise.

The gap may be fixed, or more preferably one of the aerofoils can be moved to open and close the gap.

The lower surface of the leading aerofoil and the lower surface of the projection typically form a substantially continuous aerodynamic surface when the gap is closed.

A third aspect of the invention provides an aircraft wing comprising: a leading aerofoil; a trailing aerofoil positioned behind the leading aerofoil; and a gap between the leading aerofoil and the trailing aerofoil which can be opened and closed by moving one of the aerofoils, wherein the trailing aerofoil has a sharp leading edge which seals with a lower surface of the leading aerofoil when the gap is closed.

The leading aerofoil may be shaped with an outwardly curved upper surface, an outwardly curved lower surface, and an outwardly curved leading edge. This shape tends to promote fully attached flow over the leading aerofoil, reducing noise.

BRIEF DESCRIPTION OF THE DRAWINGS

Embodiments of the invention will now be described with reference to the accompanying drawings, in which:

FIG. 1 is a sectional view of an aircraft wing showing a slat and flap in their deployed positions;

FIG. 2 is a sectional view of the aircraft wing showing the slat and flap in their retracted positions;

FIG. 3 is an enlarged sectional view of the leading edge of the aircraft wing;

DETAILED DESCRIPTION OF EMBODIMENT(S)

Figure 4:
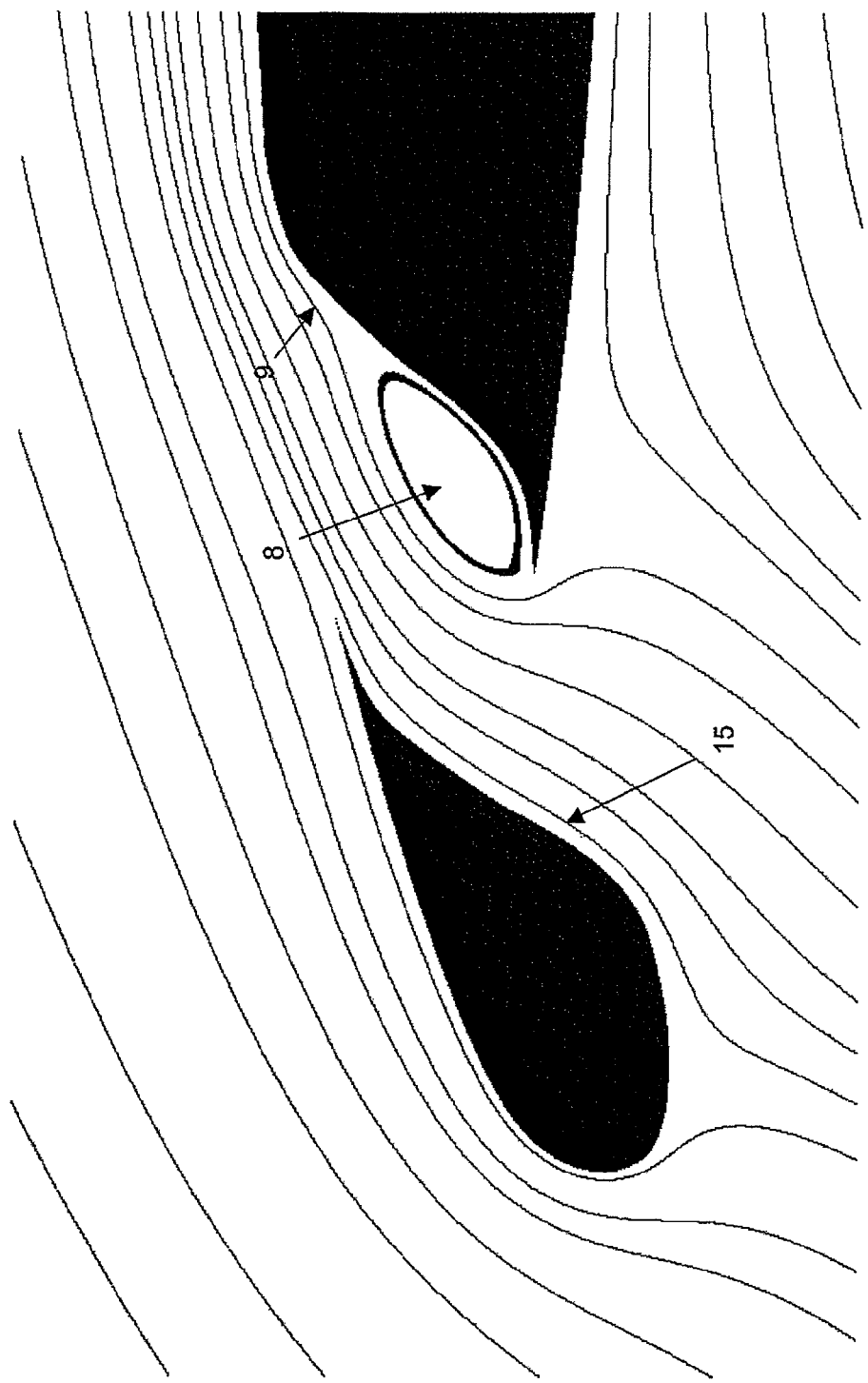
FIG. 4 is an enlarged sectional view of the leading edge of the aircraft wing showing lines of airflow at an angle of attack of 12°.

An aircraft wing shown in FIG. 1 comprises a main element 1, a slat 10 and a flap 20. The main element 1 has an upper surface 2, a lower surface 3; a leading edge 4 between the upper and lower surfaces at the front of the main element, and a trailing edge 5 between the upper and lower surfaces at the rear of the main element. The slat 10 is positioned in front of the leading edge 4 of the main element 1, and has an upper surface 11, a lower surface 12; a blunt leading edge 13 between the upper and lower surfaces at the front of the slat, and a sharp trailing edge 14 between the upper and lower surfaces at the rear of the slat. The flap 20 is positioned behind the trailing edge 5 of the main element 1, and has an upper surface 21, a lower surface 22; a sharp leading edge 23 between the upper and lower surfaces at the front of the flap, and a sharp trailing edge 24 between the upper and lower surfaces at the rear of the flap.

Although not apparent from the view of FIG. 1, the wing is swept.

The slat 10 and flap 20 can be moved between a deployed position shown in FIG. 1 in which there is a gap between the slat/flap and the main element, and a retracted position shown in FIG. 2 in which the gaps are closed. As shown in FIG. 2, the flap 20 has a sharp leading edge which seals with the lower surface of the main element 1, and the main element 1 has a sharp leading edge which seals with the lower surface of the slat 10. Therefore in their retracted positions the slat and flap both seal with the main element to form the required cruise aerofoil. That is, the upper and lower surfaces of the slat and flap form a substantially continuous aerodynamic surface with the upper and lower surfaces of the main element.

The external surfaces of the slat and flap include negative images of the leading and trailing edges of the main element respectively, so that they engage intimately with the main element when they are in the retracted position as shown in FIG. 2. However, this is not essential and in an alternative embodiment there may be a gap between the main element and the central part of the slat/flap when they are in their retracted positions. Note however that the upper and lower surfaces of the slat and flap will still seal with the main element, even in this alternative embodiment.

A mechanism such as a track with a series of rollers, or a four-bar linkage mechanism, is provided to deploy the slat and flap. The mechanism is omitted from the drawings for purposes of clarity.

The interface between the slat 10 and the main element 1 is shown in detail in FIG. 3. The leading edge of the main element 1 has a projection 6 where it meets the lower surface 3, and a smoothly curved concave cove 7 between the projection 6 and the upper surface 2.

The projection 6 has an upper surface 6a, a lower surface 6b which transitions smoothly into the lower surface 3 of the main element, and a sharp edge between the upper and lower surfaces. This sharp edge induces separated flow in air flowing over the projection, as shown in FIG. 4. A flow vortex 8 is induced in the cove above the projection; and flow is re-attached to the main element above the cove in the area generally indicated at 9.

The upper surface 11, lower surface 12 and leading edge 13 of the slat 10 are all smoothly curved and convex. As a result the flow over the slat remains attached as shown in FIG. 4, particularly at the lower surface in the region indicated generally at 15 in FIG. 4. Also, the convex lower surface 12 creates greater slat volume in comparison with a conventional slat in which the lower surface is concave. This volume can be used to store systems in the slat such as electrical harnesses for de-icing.

The slat geometry shown in FIGS. 3 and 4 moves the separated cove region onto the main element allowing the flow over the slat to be fully attached unlike conventional geometries. This removes the fundamental source of noise from the slat flow without reducing the overall lift enhancement. Any noise sources resulting from the controlled separation on the main element can be easily treated (for instance by devices on the main element) and would only radiate sound into the slat gap, not away from the aircraft. The geometry of the cove 7 on the main element allows a smooth re-attachment of the separated shear layer thus preserving lift and reducing noise propagation. The presence of wing sweep may further enhance the efficiency of the slat.

Figure 5:
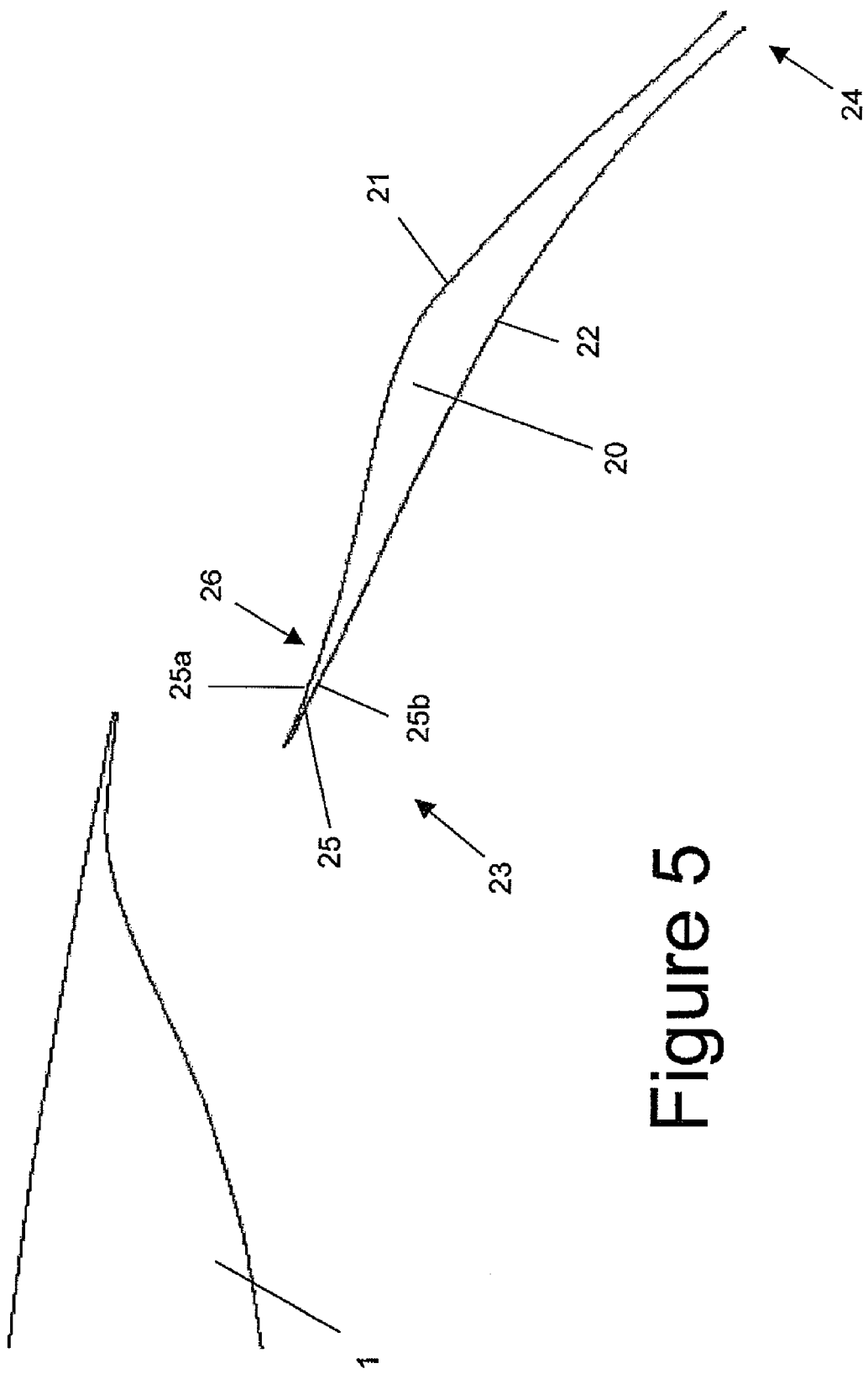
FIG. 5 is an enlarged sectional view of the trailing edge of the aircraft wing.

The interface between the flap 20 and the main element 1 is shown in detail in FIG. 5. The leading edge of the flap 20 has a projection 25 where it meets the lower surface 22, and a smoothly curved convex cove 26 between the projection 25 and the upper surface 21.

The projection 25 has an upper surface 25a, a lower surface 25b which transitions smoothly into the lower surface 22, and a sharp edge between the upper and lower surfaces. This sharp edge induces separated flow in air flowing over the projection, as shown in FIG. 6, creating a flow vortex 27.

Figure 6:
FIG. 6 is an enlarged sectional view of the trailing edge of the aircraft wing showing lines of airflow at an angle of attack of 12°.

For the trailing edge case shown in FIGS. 5 and 6, the mechanism for noise reduction is similar to the leading edge case shown in FIGS. 3 and 4. In addition there may be improvements of lift performance, particularly when the flap 20 is swept, as the trapped separated region 27 will exhibit increasingly strong axial flow that retains flow attachment to higher angles of deflection.

Figure 7:
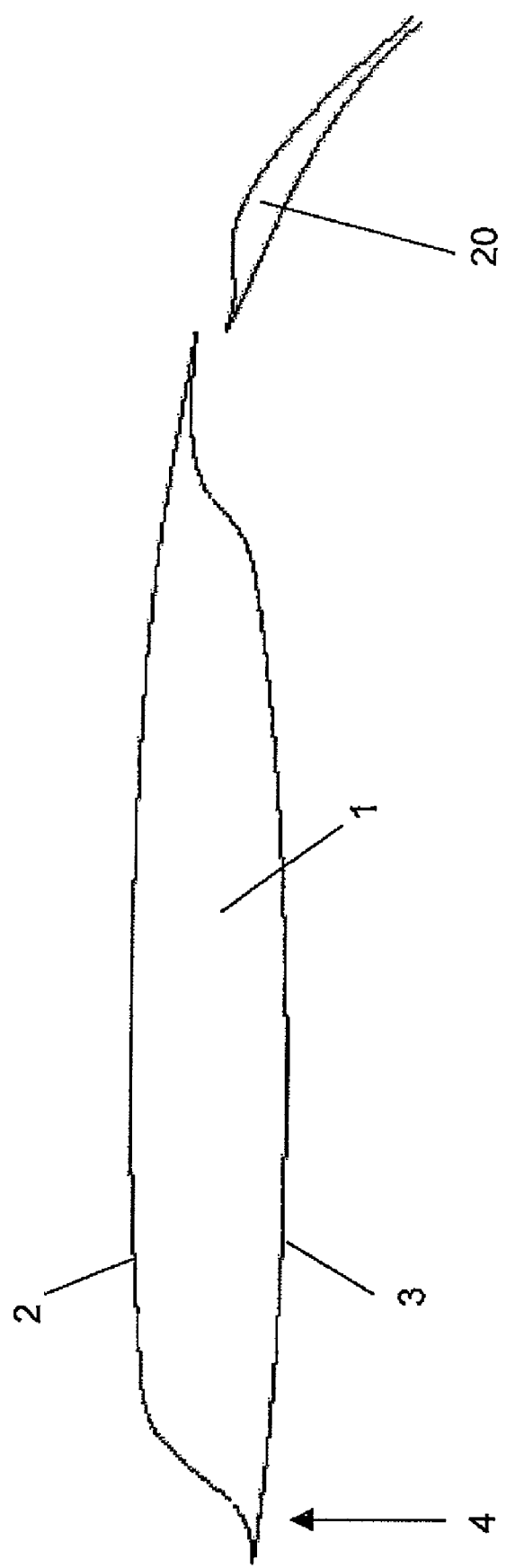
FIG. 7 is a sectional view of an aircraft wing with a sharp leading edge and no slat.

An aircraft wing according to a second embodiment of the invention is shown in FIG. 7. The wing is similar to the wing shown in FIG. 1 and similar components are labelled with the same reference numeral. In this case the slat 10 is omitted but the novel sharp leading edge 4 of the main element 1 is retained. The sharp leading edge 4 increases the stall angle of the wing, and is an improvement over a conventional stall strip (which is positioned towards the centre of a convex leading edge) because the sharp projection (being positioned where the leading edge 4 meets the lower surface 3) enables the detached flow to re-attach to the aerofoil above the cove.

Although the invention has been described above with reference to one or more preferred embodiments, it will be appreciated that various changes or modifications may be made without departing from the scope of the invention as defined in the appended claims.

The invention claimed is:

1. An aerofoil comprising: an upper surface; a lower surface; a leading edge between the upper and lower surfaces at the front of the aerofoil; and a trailing edge between the upper and lower surfaces at the rear of the aerofoil, wherein the leading edge has a projection where the leading edge meets the lower surface, and a cove between the projection and the upper surface, wherein the cove is shaped so as to generate a vortex during flight, wherein the projection has an upper surface, a lower surface which transitions smoothly into the lower surface of the aerofoil, and a sharp edge between the upper and the lower surfaces, and wherein the projection is shaped so as to induce separated flow in air flowing over the projection.

2. The aerofoil of claim 1 wherein the cove is smoothly curved.

3. The aerofoil of claim 1 wherein the cove is concave.

4. The aerofoil of claim 1, wherein the aerofoil is swept.

5. An aircraft wing, comprising: a trailing aerofoil positioned behind a leading aerofoil; and a gap between the leading aerofoil and the trailing aerofoil, wherein the trailing aerofoil comprises: an upper surface; a lower surface; a leading edge between the upper and lower surfaces at the front of the trailing aerofoil; and a trailing edge between the upper and lower surfaces at the rear of the trailing aerofoil, wherein the leading edge has a projection where the leading edge meets the lower surface, and a cove between the projection and the upper surface, wherein the cove is shaped so as to generate a vortex during flight, and wherein the trailing aerofoil can be moved in its entirety to open and close the gap.

6. The aircraft wing of claim 5 wherein the leading aerofoil has an outwardly curved upper surface, an outwardly curved lower surface, and an outwardly curved leading edge.

7. The aircraft wing of claim 5 wherein the leading aerofoil is a main element of the wing and the trailing aerofoil is a flap.

8. The aircraft wing of claim 5 wherein a lower surface of the leading aerofoil and a lower surface of the projection form a substantially continuous aerodynamic surface when the gap is closed.

9. An aircraft wing comprising: a leading aerofoil; a trailing aerofoil positioned behind the leading aerofoil; and a gap between the leading aerofoil and the trailing aerofoil which can be opened and closed by moving the trailing aerofoil in its entirety, wherein the trailing aerofoil comprises: an upper surface; a lower surface; a sharp leading edge between the upper and lower surfaces at the front of the trailing aerofoil; and a trailing edge between the upper and lower surfaces at the rear of the trailing aerofoil, wherein the sharp leading edge has a projection where the sharp leading edge meets the lower surface, and a cove between the projection and the upper surface, wherein the cove is shaped so as to generate a vortex during flight, wherein the trailing aerofoil can be moved in its entirety to open and close the gap, and wherein the sharp leading edge which seals with a lower surface of the leading aerofoil when the gap is closed.

10. The wing of claim 9 wherein the leading aerofoil has an outwardly curved upper surface, an outwardly curved lower surface, and an outwardly curved leading edge.

11. The wing of claim 9 wherein the leading aerofoil is a main element of the wing and the trailing aerofoil is a flap.

12. The wing of claim 9 wherein a lower surface of the leading aerofoil and a lower surface of the projection form a substantially continuous aerodynamic surface when the gap is closed.

13. A method of controlling the flow of air over an aerofoil comprising a leading aerofoil and a trailing aerofoil positioned behind the leading aerofoil with a sharp leading edge which seals with a lower surface of the leading aerofoil, the method comprising:

moving the trailing aerofoil in its entirety to open a gap between the leading aerofoil and the trailing aerofoil;
inducing separated flow with a projection in the leading edge of the trailing aerofoil;
inducing a flow vortex in a cove above the projection; and
re-attaching flow to the trailing aerofoil above the cove.

14. An aircraft wing, comprising: a trailing aerofoil positioned behind a leading aerofoil;
and a gap between the leading aerofoil and the trailing aerofoil,
wherein the trailing aerofoil comprises: an upper surface; a lower surface; a leading edge between the upper and lower surfaces at the front of the trailing aerofoil; and a trailing edge between the upper and lower surfaces at the rear of the trailing aerofoil, wherein the leading edge has a projection where the leading edge meets the lower surface, and a cove between the projection and the upper surface, wherein the cove is shaped so as to generate a vortex during flight, and wherein the leading aerofoil can be moved in its entirety to open and close the gap.

15. The wing of claim 14 wherein the leading aerofoil is a slat and the trailing aerofoil is a main element of the wing.

16. A method of controlling the flow of air over an aerofoil comprising a leading aerofoil and a trailing aerofoil positioned behind the leading aerofoil with a sharp leading edge which seals with a lower surface of the leading aerofoil, the method comprising:

moving the leading aerofoil in its entirety to open a gap between the leading aerofoil and the trailing aerofoil;
inducing separated flow with a projection in the leading edge of the trailing aerofoil;
inducing a flow vortex in a cove above the projection; and
re-attaching flow to the trailing aerofoil above the cove.

17. An aircraft wing comprising: a leading aerofoil; a trailing aerofoil positioned behind the leading aerofoil; and a gap between the leading aerofoil and the trailing aerofoil which can be opened and closed by moving the leading aerofoil in its entirety, wherein the trailing aerofoil comprises: an upper surface; a lower surface; a sharp leading edge between the upper and lower surfaces at the front of the trailing aerofoil; and a trailing edge between the upper and lower surfaces at the rear of the trailing aerofoil, wherein the sharp leading edge has a projection where the sharp leading edge meets the lower surface, and a cove between the projection and the upper surface, wherein the cove is shaped so as to generate a vortex during flight, wherein the leading aerofoil can be moved in its entirety to open and close the gap, and wherein the sharp leading edge seals with a lower surface of the leading aerofoil when the gap is closed.

18. The wing of claim 17 wherein the leading aerofoil has an outwardly curved upper surface, an outwardly curved lower surface, and an outwardly curved leading edge.

19. The wing of claim 18 wherein the leading aerofoil is a slat and trailing aerofoil is a main element of the wing.

20. The wing of claim 19 wherein a lower surface of the leading aerofoil and a lower surface of the projection form a substantially continuous aerodynamic surface when the gap is closed.

* * * * *